(12) United States Patent
Mosso et al.

(10) Patent No.: US 9,353,667 B2
(45) Date of Patent: May 31, 2016

(54) EXHAUST PRESSURE LINE FOR AN INTERNAL COMBUSTION ENGINE

(75) Inventors: Silvio Domenico Mosso, Rivoli (IT); Luca Giuseppe Pairolero, Cascine Vica Rivoli (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 738 days.

(21) Appl. No.: 13/546,389

(22) Filed: Jul. 11, 2012

(65) Prior Publication Data
US 2013/0014495 A1  Jan. 17, 2013

(30) Foreign Application Priority Data

Jul. 12, 2011  (GB) .................................. 1111906.2

(51) Int. Cl.
| F01N 3/02 | (2006.01) |
| F01N 9/00 | (2006.01) |
| F01N 13/00 | (2010.01) |
| F01N 3/023 | (2006.01) |

(52) U.S. Cl.
CPC ............... *F01N 9/002* (2013.01); *F01N 3/023* (2013.01); *F01N 13/001* (2013.01); *F01N 13/008* (2013.01); *F01N 2560/08* (2013.01); *Y02T 10/47* (2013.01)

(58) Field of Classification Search
CPC ...... F02B 77/085; F02B 77/086; F01N 9/002; F01N 13/001; F01N 3/023; F01N 2560/08
USPC ..................... 60/297, 311; 73/114.75, 114.76
See application file for complete search history.

(56) References Cited

U.S. PATENT DOCUMENTS

| 6,929,520 | B1* | 8/2005 | Hughes et al. .............. 440/88 G |
| 8,337,172 | B2* | 12/2012 | Klika et al. .................... 417/364 |
| 2003/0230075 | A1 | 12/2003 | Saito et al. |
| 2007/0130919 | A1 | 6/2007 | Lee |
| 2007/0135968 | A1 | 6/2007 | Bellinger et al. |
| 2008/0110238 | A1 | 5/2008 | Kariya et al. |
| 2009/0151330 | A1* | 6/2009 | Chamarthi et al. ............. 60/286 |
| 2011/0138794 | A1 | 6/2011 | Yamamoto |

FOREIGN PATENT DOCUMENTS

WO  2006059219 A1  6/2006

* cited by examiner

*Primary Examiner* — Audrey K Bradley
*Assistant Examiner* — Jason Sheppard
(74) *Attorney, Agent, or Firm* — Ingrassia Fisher & Lorenz PC

(57) ABSTRACT

An exhaust pressure line for an internal combustion engine is provided. The internal combustion engine has an engine block and is equipped with a Diesel Particulate Filter. The exhaust pressure line has a pressure line configured to send pressure signals from the Diesel Particulate Filter to an exhaust pressure sensor. A portion of the pressure line extends through the engine block.

7 Claims, 3 Drawing Sheets

EXHAUST PRESSURE LINE FOR AN INTERNAL COMBUSTION ENGINE

CROSS-REFERENCE TO RELATED APPLICATION

This application claims priority to British Patent Application No. 1111906.2, filed Jul. 12, 2011, which is incorporated herein by reference in its entirety.

TECHNICAL FIELD

The present disclosure relates to an exhaust pressure line for an internal combustion engine.

BACKGROUND

Traditional internal combustion engines, and in particular Diesel engines, have an engine block defining one or more cylinders each having a piston coupled to rotate a crankshaft. A cylinder head cooperates with the piston to define a combustion chamber. Fuel combustion in the combustion chamber generates a significant amount of exhaust gas that is directed into an exhaust system.

The exhaust system may include an exhaust pipe having one or more exhaust aftertreatment devices, among which a Diesel Particulate Filter (DPF) may be provided, namely a device designed to remove diesel particulate matter or soot from the exhaust gas of the engine.

More specifically, in some engines the DPF is mounted very close to the engine block giving rise to a configuration also known as close coupled DPF (CCDPF).

Current Diesel engine architectures equipped with CCDPF devices monitor the soot accumulation in the DPFs through a pressure drop measurement within the DPF devices themselves.

This measurement is done by a comparison between an upstream DPF pressure signal and a downstream DPF pressure signal.

The upstream DPF pressure signal is detected by means of an upstream pressure line that connects an upstream pressure port of the DPF to the exhaust pressure sensor. The downstream DPF pressure signal is detected by means of a downstream pressure line that connects a downstream pressure port of the DPF to the exhaust pressure sensor.

These pressure line connections form an exhaust pressure line and the whole exhaust pressure line is located externally with respect to the engine block perimeter.

The pressure lines are made by metal (generally stainless steel) and are fixed to the engine block by fixation points or by dedicated brackets in such a way to create a slope that guarantees that the pressure line is horizontal or downward oriented from exhaust pressure sensor to CCDPF pressure ports, in order to avoid water or moisture accumulation in the lines.

The connections between the metal pipe pressure line and the CCDPF pressure port (exhaust side) and the exhaust pressure sensor (sensor side) are made by plastic or rubber hoses designed to withstand the maximum operating temperatures and to guarantee the sealing of the connections.

Known pressure lines are configured with a minimum length to guarantee a temperature reduction of the exhaust gas before the pressure measurement inside the dedicated sensor.

The exhaust pressure sensor is located in a cold area of the engine compartment, which is normally the engine intake side area, to guarantee that the maximum operating temperature of the sensor, which is generally lower than 130° C., is not exceeded.

This conventional solution has several drawbacks.

A first drawback is that the external metal pipes and the relative brackets have a relevant cost.

A second drawback is that, since the exhaust pressure sensor is in an elevated position to guarantee a certain slope for the pressure line and since the pressure line crosses a region of the engine compartment in which many devices and connections are present, the design of a pressure line according to the prior art has a considerable complexity that also has a negative impact on costs.

At least one object of an embodiment disclosed is to overcome the above mentioned drawbacks by a pressure line for an internal combustion engine that guarantees substantial costs savings in design and production.

Another object is to provide an improved pressure line in an internal combustion engine in a simpler and more rational way.

In addition, other objects, desirable features and characteristics will become apparent from the subsequent summary and detailed description, and the appended claims, taken in conjunction with the accompanying drawings and this background.

SUMMARY

An embodiment of the disclosure provides an exhaust pressure line for an internal combustion engine. The internal combustion engine has an engine block and is equipped with a Diesel Particulate Filter. The pressure line is arranged to connect the Diesel Particulate Filter to an exhaust pressure sensor, wherein the pressure line comprises a portion that extends through the engine block.

In this regard, a portion of the exhaust pressure line passes inside the engine block guaranteeing a more stable gas temperature during operation of the engine, especially during CCDPF regeneration.

According to a further embodiment, the exhaust pressure line comprises an upstream pressure line that connects an upstream pressure port of the Diesel Particulate Filter to the exhaust pressure sensor and a downstream pressure line that connects a downstream pressure port of the Diesel Particulate Filter to the exhaust pressure sensor. The upstream pressure line and the downstream pressure line include respectively an upstream and a downstream cavity that extend through the engine block.

In this regard, a more compact design of the exhaust pressure line is obtained, considering also the high density of components present inside the engine compartment.

According to a further embodiment, the cavities inside the engine block are obtained by a foundry process or by machining.

Accordingly, the cavities may be obtained by conventional techniques.

According to a further embodiment, the two cavities in the engine block are located parallel to each other in a top lateral portion of the engine block.

Accordingly, a rational placement of the pressure line is achieved considering also the tooling or foundry process that may be employed in realizing the cavities.

According to a further embodiment, the two cavities in the engine block are located on the same side of the engine block which is close to a transmission flange and placed in a cold area of the engine.

In this regard, this position is close to the CCDPF location. Furthermore, the surrounding area has less density of engine components and allows an easier location of the connections for realizing the pressure line.

According to a further embodiment, an inlet and an outlet of each of the two cavities are connected to respective external hoses for connection between the upstream and downstream pressure ports of the Diesel Particulate Filter and the exhaust pressure sensor.

Accordingly, the thermal stabilization of the temperature made by the engine block relaxes the requirements to configure the length of the hoses between engine block and exhaust pressure sensor to specific values in order to reduce maximum gas operating temperature.

According to a further embodiment, the external hoses are connected to the two cavities by means of press fitted spigots.

This allows a simple assembly of the exhaust pressure line.

According to a further embodiment, the external hoses are connected to metal connectors on the upstream and plastic connectors on the exhaust pressure sensor.

This embodiment takes advantage of existing metal connectors of the DPF.

A further embodiment provides an engine block for an internal combustion engine, the engine block having a through cavity for fluidly connecting an exhaust pressure line to an exhaust pressure sensor.

Another embodiment provides an internal combustion engine, the engine being equipped with a Diesel Particulate Filter. The Diesel Particulate Filter has pressure ports for connections, by means of an exhaust pressure line, to an exhaust pressure sensor. The engine is equipped with an engine block in which a portion of the exhaust pressure line connecting the Diesel Particulate Filter to the exhaust pressure sensor is arranged.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Preferred embodiments will now be described with reference to the enclosed drawings.

Figure 1:
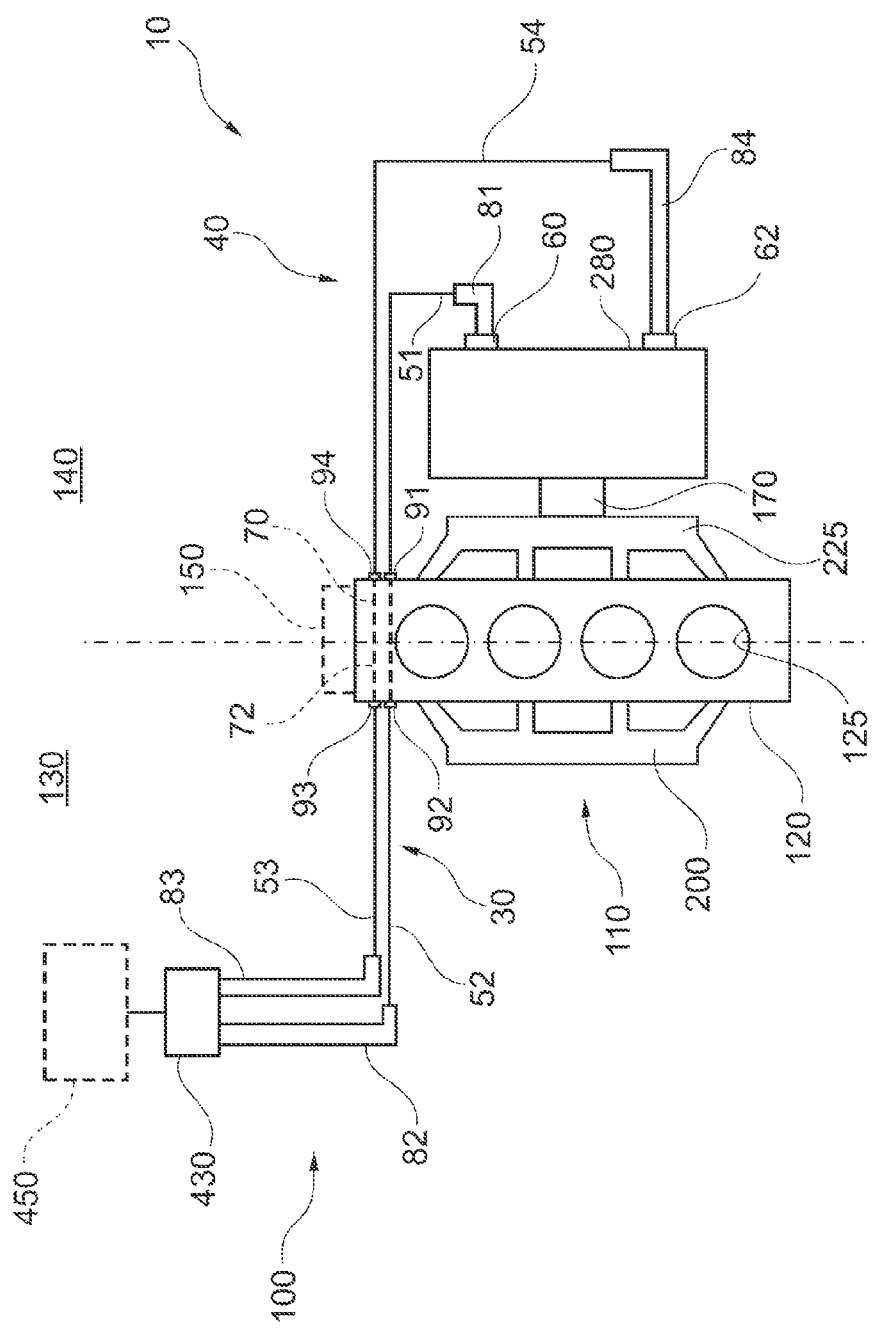
FIG. 1 shows a schematic representation of an internal combustion engine equipped with an exhaust pressure line according to an embodiment.
Figure 2:
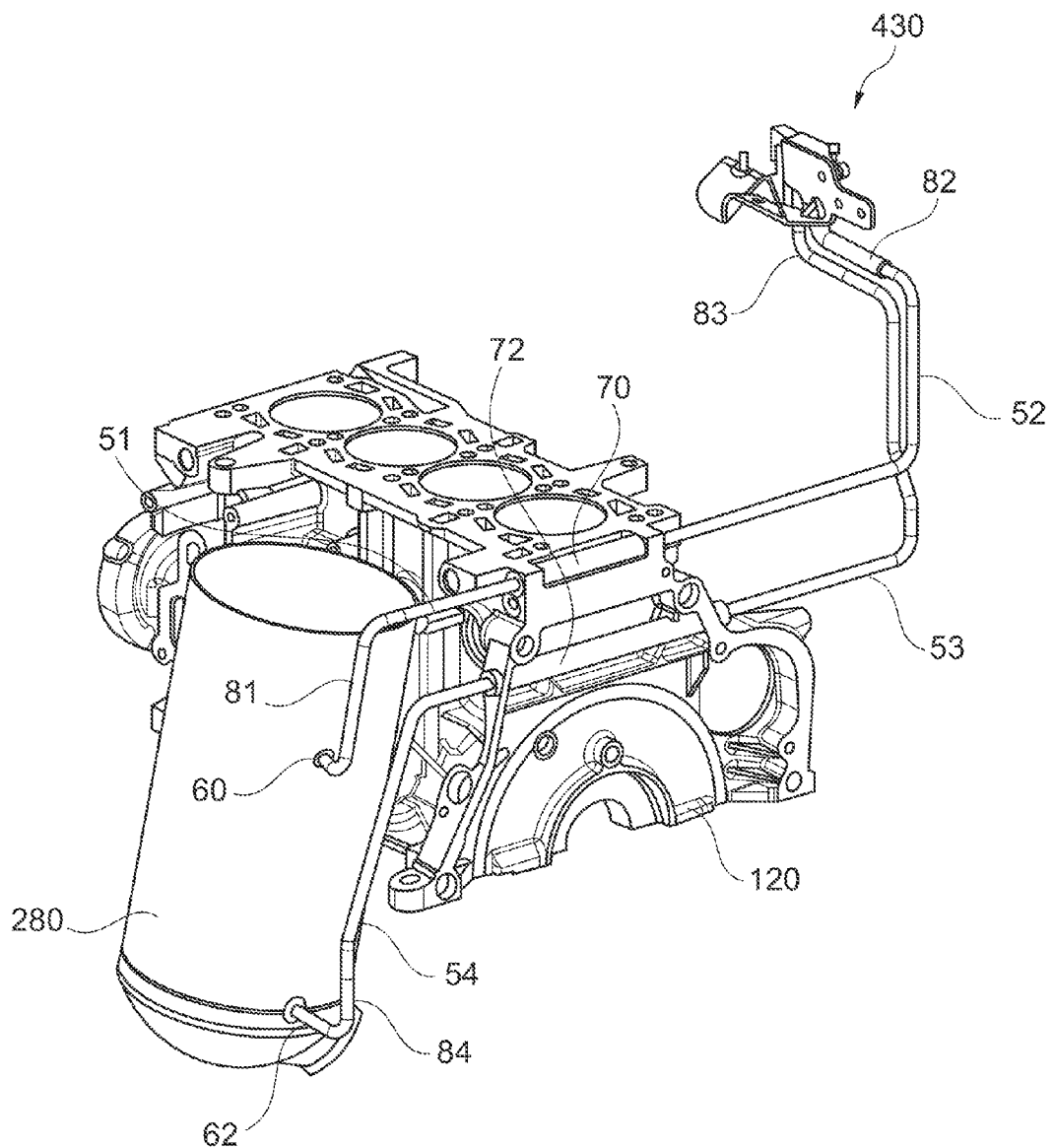
FIG. 2 shows an internal combustion engine block equipped with the exhaust pressure line according to an embodiment.
Figure 3:
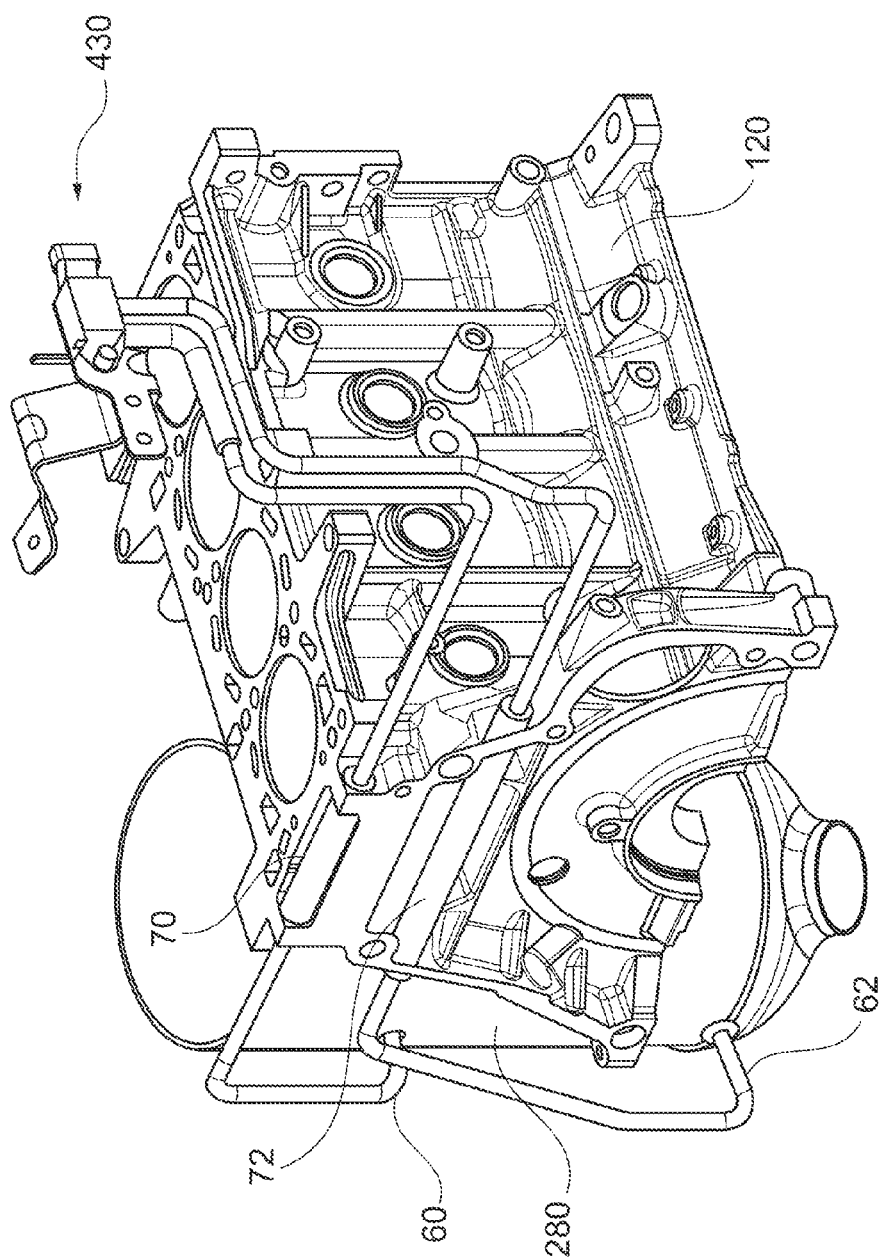
FIG. 3 is a further view of an internal combustion engine block equipped with the exhaust pressure line according to an embodiment.

Various embodiments include an automotive system 100, as shown in FIGS. 1-3, that includes an internal combustion engine (ICE) 110 having an engine block 120 defining one or more cylinders 125 each having a piston coupled to rotate a crankshaft. A cylinder head cooperates with the piston to define a combustion chamber. Fuel combustion in the combustion chamber generates a significant amount of exhaust gas that is directed into an exhaust system.

The internal combustion engine 110 is also equipped with an intake manifold 200 for providing air from the ambient environment to the engine 110 and with an exhaust manifold 225 that directs exhaust gases from the engine 110 into an exhaust system. The exhaust system may include one or more exhaust aftertreatment devices, and in particular may include a Diesel Particulate Filter (DPF) 280, configured to change the composition of the exhaust gases.

In particular the DPF 280 may be constituted by a close coupled DPF (CCDPF) which indicates a DPF 280 mounted (in 170) very close to the engine block 120.

The DPF 280 is provided with an exhaust pressure line 10 that is used to send pressure signals from the DPF 280 to an exhaust pressure sensor 430. The exhaust pressure sensor 430 may be electrically connected to an electronic control unit (ECU) 450 that may receive input signals from the sensor 430 that are proportional to values of pressure upstream and downstream of the DPF 280.

More specifically, an embodiment comprises an exhaust pressure line 10, subdivided in an upstream pressure line 30 and a downstream pressure line 40, wherein the upstream pressure line 30 is suitable to send a signal representative of the pressure upstream of the DPF 280 and the downstream pressure line 40 is suitable to send a signal representative of the pressure downstream of the DPF 280.

The upstream pressure line 30 exits from an upstream pressure port 60 in the DPF 280 and is provided with a first upstream connector 81 exiting from the upstream pressure port 60 in the DPF 280 and connected to a first upstream external hose 51.

First upstream external hose 51 is in turn connected to an inlet of an upstream line cavity 70 in the engine block 120 and a second upstream external hose 52 is provided between an outlet of the upstream line cavity 70 and a second upstream connector 82 which is in turn connected to the exhaust pressure sensor 430.

The connection of the external hoses 51, 52 with the upstream line cavity 70 may be realized by means of dedicated press fitted spigots 91, 92.

Therefore the upstream pressure line 30 comprises a first portion that extends through the engine block 120 and that connects an upstream portion of the Diesel Particulate Filter 280 to the exhaust pressure sensor 430.

In a similar fashion, the downstream pressure line 40 exits from downstream pressure port 62 in the DPF 280 and is provided with a first downstream connector 84 exiting from a downstream pressure port 62 and connected to a first downstream external hose 54. First downstream external hose 54 is in turn connected to an inlet of a downstream line cavity 72 in the engine block 120 and a second downstream external hose 53 is provided between an outlet of the downstream line cavity 72 and a second downstream connector 83 which in turn is connected to the exhaust pressure sensor 430.

The connection of the external hoses 53, 54 with the downstream line cavity 72 may also be realized by means of dedicated press fitted spigots 93, 94.

Therefore the downstream pressure line 40 comprises a second portion that extends through the engine block 120 and that connects a downstream portion of the Diesel Particulate Filter 280 to the exhaust pressure sensor 430.

The external hoses 51, 52, 53 and 54 may be realized in rubber or plastic.

The upstream and downstream connectors may be realized in metal, for example, in stainless steel.

Upstream and downstream cavities 70, 72 inside the engine block 120 can be obtained by foundry process or by machining and are suitable to put in connection the exhaust side 140 of the engine 110 with the intake side 130.

The cavities 70, 72 may be located parallel to each other in a top surface lateral portion of the engine block 120.

The two cavities 70, 72 inside the engine block 120 shall be designed immediately at the beginning of the project from the engine block concept.

The two cavities 70, 72 could be located on the rear side of the engine block 120 close to a transmission flange 150.

This location is beneficial for several reasons.

A first advantage of this location is that this is a cold area of the engine compartment. A further advantage is that this position is close to the CCDPF location.

Also, this area has less density of surrounding components and allows a more free location of the press fitted spigots 91-94.

The location of the two cavities 70, 72 shall avoid any impact on the structural performance of the engine block 120. The location of the cavities 70, 72 in a side of the engine block 120 close to a transmission flange 150 guarantees to operate at a temperature below the maximum continuous operating temperature limit of the sensor, with a safety margin for all different operating conditions.

Generally speaking, the cavities 70, 72 need not to be parallel, but may have non-parallel configuration. In an embodiment, the cavities 70, 72 are on the same plane.

A preferred, but nonexclusive, solution is to realize two rectilinear cavities that are parallel and are located in an area which is easy to treat by foundry operation or by machining.

Also, the two cavities 70, 72 need not to be placed on the same side of engine block 120, but preferentially areas with low components density and low temperatures should be chosen.

Maximum operating gas temperature can be reduced with a customized length of the external hoses 52-53 between engine block 120 and exhaust pressure sensor 430.

In addition, the engine block 120, having a substantial thermal capacity, guarantees a more stable gas temperature during operation, and this is an advantage during CCDPF regeneration.

The constant slope of the pressure line 10 is downward oriented from the exhaust pressure sensor 430 to the DPF 280. This is satisfied, for example, in case the engine 110 is assembled on the vehicle with a downward inclination towards the front of the vehicle, typically having a value between 8° to 15°.

This inclination is intended from the intake side 130 to the exhaust side 140, with the exhaust side 140 located on the front side of the vehicle. The inclination of the pressure line avoids water and moisture accumulation in the pressure line that could create problems during winter at low temperatures when the engine is not operating.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. An internal combustion engine comprising:
   a Diesel Particulate Filter comprising an upstream pressure port and a downstream pressure port;
   an exhaust pressure sensor;
   an engine block, comprising:
   an upstream cavity;
   a downstream cavity;
   an exhaust side of the engine block; and
   an intake side of the engine block;
   wherein the upstream cavity and the downstream cavity extend through the engine block and connect the exhaust side to the intake side; and an exhaust pressure line connecting the Diesel Particulate Filter to the exhaust pressure sensor, wherein a portion of the exhaust pressure line extends through a cavity of the engine block, the exhaust pressure line comprising:
   an upstream pressure line coupled to the upstream pressure port of the Diesel Particulate Filter, extending through the upstream cavity, and coupled to the exhaust pressure sensor to connect the upstream pressure port to the exhaust pressure sensor;
   a downstream pressure line coupled to the downstream pressure port of the Diesel Particulate Filter, extending through the downstream cavity, and coupled to the exhaust pressure sensor, to connect the downstream pressure port to the exhaust pressure sensor.

2. The internal combustion engine as in claim 1, wherein the upstream and downstream cavities inside the engine block are obtained by a foundry process or by machining.

3. The internal combustion engine as in claim 1, wherein the upstream and downstream cavities inside the engine block are located on the same plane in a top lateral portion of the engine block.

4. The internal combustion engine as in claim 1, wherein the upstream and downstream cavities in the engine block are located on the same side of the engine block proximate to a transmission flange.

5. The internal combustion engine as in claim 1, further comprising:
   external hoses, configured to connect the upstream and downstream pressure ports of the Diesel Particulate Filter and the exhaust pressure sensor.

6. The internal combustion engine as in claim 5, further comprising:
   press fitted spigots, configured to connect the external hoses to the upstream cavity and the downstream cavity.

7. The internal combustion engine as in claim 5, further comprising:
   metal connectors, positioned on the upstream pressure port and the downstream pressure port of the Diesel Particulate Filter and on the exhaust pressure sensor, the metal connectors configured to connect to the external hoses.

* * * * *